Dec. 26, 1967      F. H. ADAMS      3,359,757

UNIVERSAL JOINT

Filed Sept. 10, 1965

INVENTOR.
FRANK H. ADAMS
BY Hoffmann and Yount
ATTORNEYS

United States Patent Office 3,359,757
Patented Dec. 26, 1967

3,359,757
UNIVERSAL JOINT
Frank H. Adams, 18711 S. Woodland Ave.,
Cleveland, Ohio 44120
Filed Sept. 10, 1965, Ser. No. 486,350
3 Claims. (Cl. 64—8)

ABSTRACT OF THE DISCLOSURE

A universal joint having a first member provided with external ribs and portions of its exterior spherical-shaped, positioned in a cylindrical aperture in a second member having internal axially extending grooves of uniform width and depth with the ribs of the first member located in the grooves of the second member, and segmental-shaped members interposed between adjoining sides of the ribs and grooves with their curved sides seated in complementary apertures in the sides of the ribs and their planar sides engaging the planar sides of the grooves.

The present invention relates in general to universal joints and more particularly to constant velocity universal joints wherein the driving and driven members rotate at the same angular velocities regardless of the angularity of their axes of rotation.

Constant velocity universal joints are characterized by structure in which points of contact between the driving and driven members lie in a plane intermediate planes transverse to the axes of rotation of the respective members and when the axes of the members are not co-extensive there is sliding between the members along this plane of contact. Universal joints are usually employed as a part of a drive between members which move toward and from one another during operation of the apparatus in which the joint is used. This is particularly true in automotive applications, for example, where the drive from the engine is connected to a wheel or axle connected to the automobile frame for relatively linear movement with respect thereto incident to the automobile traveling on a rough highway surface. Where conventional universal joints are used in such environments, additional structure must ordinarily be provided in conjunction with the joint to prevent the occurrence of detrimental axial forces. This additional structure is generally a spline connection between shaft members in the drive chain and which represents additional costs.

Constant velocity universal joints as heretofore constructed are generally of complex design, have intricate structure, and are not well adapted to inexpensive manufacturing techniques.

One of the principal objects of the present invention is the provision of a new and improved constant velocity universal joint which is simple in construction, inexpensive to manufacture, capable of transmitting load in opposite rotational directions and wherein the members of the joint may move axially with respect to each other.

Another object of the present invention is the provision of a new and improved constant velocity universal joint comprising two members drivingly connected by cooperating abutting planar surfaces for the transmission of load from one member to the other in either direction of rotation, the surfaces of one member being slidable relative to the surfaces of the other member with which they cooperate and the surfaces of one member being supported for rotation about an axis normal to the axis of rotation of the last mentioned member.

Other objects and advantages of the invention will be apparent from the following description of the preferred embodiments thereof made with reference to the accompanying drawings in which similar reference characters designate corresponding parts and wherein.

Figure 1:
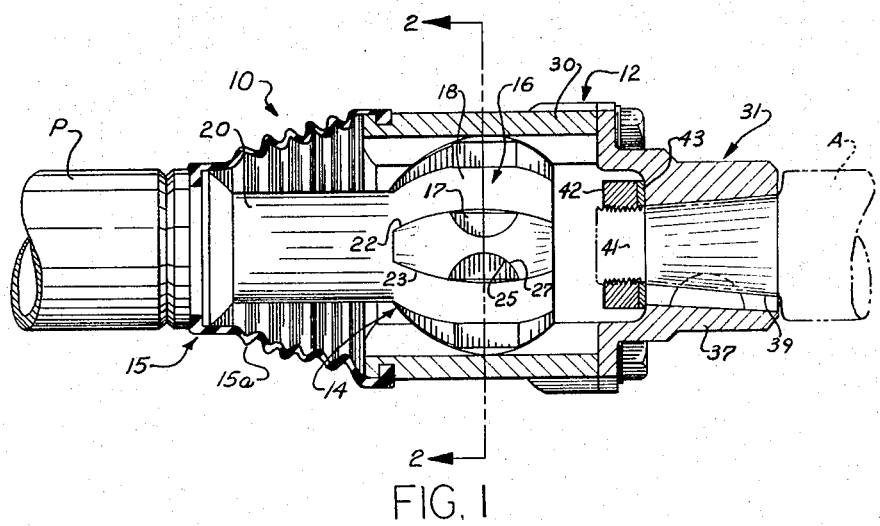
FIG. 1 is an elevational view of a drive mechanism employing a preferred embodiment of the present invention having portions broken away and portions shown in phantom lines to better show the relationship between certain parts of the assembled joint.

The drawings designate a drive shaft A which, for example, may be the output shaft of an automobile transmission connected to a driven shaft P, which may be a conventional automobile propeller shaft, by means of constant velocity universal joint 10 embodying the present invention. The universal joint 10 includes an outer joint assembly 12 and an inner joint assembly 14 and a dust guard 15 connected at its ends to the inner and outer assemblies for retaining lubricant in the joint and preventing foreign matter from entering the joint. The dust guard is composed of flexible material and includes a corrugated annular wall 15a for allowing the dust guard to move universally with the assemblies without being dislodged therefrom.

Figure 2:
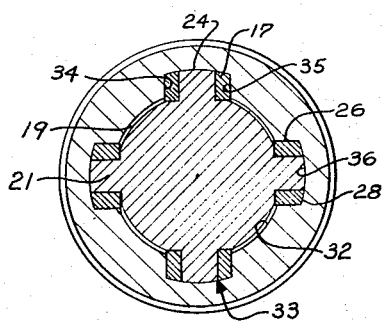
FIG. 2 is a sectional view taken approximately at the line 2—2 of FIG. 1.
Figure 3:
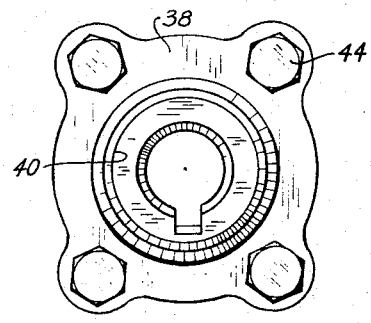
FIG. 3 is a side elevation view of FIG. 1 having the portions in phantom omitted.

Inner joint assembly 14 includes an inner member 16 and bearing members 17. Inner member 16 includes a body portion 18 having a convex spherically curved outer body surface 19 extending lengthwise of the body and which is integrally formed on a stub shaft 20. Stub shaft 20 is connected to shaft P by suitable means such as a swaged joint. Body portion 18 has four longitudinal ribs 21 extending radially from surface 19, and which have oppositely curved side surfaces 22 and 23 such that each rib has a maximum width medially of its ends. Since ribs 21 are identical in construction only one will be described. Rib 21 has a convex spherically curved radially outer surface 24 extending between its ends and has semi-cylindrical recesses 25 in opposite side surfaces 22 and 23 and which extend from the surface 19 to surface 24. The rib supports the semi-cylindrical bearing members 17 which nest in recesses 25. Each of the bearing members includes a planar surface 26 extending in a generally radial direction from the axis of member 16 and a semi-cylindrical surface 27 adapted to cooperate with recess 25 so that surface 27 may slide with respect to the recess surface permitting rotation of bearing members 17 about an axis normal to the axis of rotation of member 16. Bearing members 17 protrude circumferentially from the recesses 25 and have radially outer surfaces 28 which, in the form shown, are co-extensive with outer surface 24 of ribs 21. Planar surfaces 26 of bearing members 17 on opposite sides of the rib 21 are in abutting engagement with planar surfaces 34 and 35 on the outer joint assembly 12, best shown in FIG. 2.

Outer joint assembly 12, includes outer body 30 and a flanged collar member 31 for interconnecting body 30 and shaft A. Body 30 has an axially extending bore 32 therethrough and four straight-sided grooves 33 extending axially through the body and opening into bore 32. The grooves 33 receive the ribs 21 and bearing members 17 with the planar side surfaces 26 of the bearing members engaged with opposed planar side surfaces 34 and 35 of the grooves 33. Body portion 18 and ribs 21 are dimensioned so as to be slidably received in bore 31 and grooves 33, respectively, of member 12. Bearings 17 are of such dimension that inner assembly 14 will slide freely in the outer assembly 12 but will not be loose. In the form illustrated, outer surface 24 of each rib bears on a base portion 36 of the grooves to limit radial play between the inner and outer assemblies, however, it should be apparent that the curved surface 19 of body portion 18 could perform this bearing function if desired.

Collar member 31 connects shaft A and outer body 30 and includes a hub 37 and a flange portion 38. Hub 37 includes a conical bore 40 therethrough receiving a conically tapered end 38 of shaft A. Relative rotation between shaft A and hub 37 is prevented by a key and key way arrangement therebetween. The end of shaft A is provided with threads 41 for reception of a nut 42 and washer 43 which prevent axial movement of the shaft A with respect to the hub. Flange portion 38 of the member 31 extends radially outwardly from hub 37 and is connected to the outer body 30 by screws 44 which extend through holes in the flange portion and into the body 30.

The planar side surfaces 26 of bearing members 17 form planar opposed abutment surfaces on the inner joint assembly 14 which lie between and are engaged with the opposed planar abutments formed by the side walls of the grooves in the outer joint assembly. This structure allows the universal joint to transmit torque load regardless of its direction of rotation. Further, the planar abutments are slidable with respect to each other so that either or both of the joint assemblies may move along their respective axes of rotation without affecting the operation of the universal joint. By virtue of the rotatability of the bearing members 17 in the recesses 25, the abutments on the inner joint assembly are rotatable about an axis which is generally normal to the axis of rotation of the inner assembly. This structure permits the abutment surfaces on the inner joint assembly 14 to remain in coplanar engagement with the abutments on the outer joint assembly 12 when the axes of rotation of the outer member and the inner assembly are not in alignment. The construction is such that the universal joint described herein permits the driven member to be rotated at an angular velocity which corresponds to the angular velocity of the driving member at all times regardless of angularity between the axes of rotation of the members so that the angular velocity of the driving and driven member is uniform.

A universal joint embodying the present invention may be assembled and used as follows, reference being made to FIG. 1. Member 16 is connected to a shaft, such as the shaft P, in a suitable manner as by swaging, and bearing members 17 are held in recesses 25 while outer assembly 12 is slid onto the inner member 16. Outer assembly 12 then may be attached in axial alignment with another shaft or rotatable member, such as shaft A, by suitable means such as by the arrangement shown.

A universal joint of the type described is simple in construction and easily manufactured. The outer surface 19 on the inner member 16 and the outer surface of ribs 21 may be formed by hobbing on conventional hobbing equipment. The outer body 30 of the member 12 may be formed by broaching and the side surfaces 22 and 23 of the ribs 21 and recesses 24 may be formed on a conventional milling machine. The bores in the flanged collar member 31 and the means for attaching the shaft P to the joint member 14 may be formed by convenient means well known to those skilled in the art to which the invention pertains.

It should be appreciated that while side surfaces 22 and 23 are shown and described herein as curved, these sides may have other configurations so long as clearance is provided between the sides of ribs 21 and the sides 34 and 35 of grooves 33, and support for bearings 13 is provided by the rib structure.

From the foregoing description of the preferred embodiments of the invention, it will be apparent that the objects heretofore enumerated and others have been accomplished and that there has been provided a novel and improved constant velocity universal joint which is simple and rugged in construction and reliable in operation together with a novel method of manufacturing such a joint. While the preferred embodiments have been described in detail the invention is not to be considered to be limited to the particular constructions shown and it is intended to cover all adaptations, modifications and uses thereof which come within the practice of those skilled in the art to which the invention relates and within the scope of the appended claims.

Having described my invention, I claim:

1. In a universal joint, a first member adapted for rotation about an axis, a second member adapted for rotation about an axis, said first member surrounding said second member and including axially extending grooves therein forming opposed planar abutment surfaces extending generally radially of its axis of rotation, abutment means providing opposed abutment surfaces on said second member and extending generally radially of its axis of rotation, said means including a semicylindrical bearing surface in engagement with a portion of said second member, the abutment surfaces on said second member being disposed between the abutment surfaces on said first member and being in slidable engagement therewith respectively, means for supporting said abutment means on said second member for rotation about an axis normal to the axis of rotation of said second member, said supporting means including rib members extending axially along said second member and radially into said grooves, each of said rib members having a spherically curved outer radial surface in bearing engagement with an outer radial surface of said grooves and each of said rib members including semicylindrical recesses therein for receiving said semicylindrical bearing surfaces of said abutment means whereby said members may slide axially with respect to each other and rotate at uniform angular velocities in either direction of rotation.

2. In a universal joint, a first member adapted for rotation about an axis, a second member adapted for rotation about an axis, said first member surrounding said second member and having an interior cylindrical aperture therein coaxial with its axis of rotation and opening into at least one end thereof and provided with axially extending grooves of uniform width and depth the sides of which form opposed planar abutment surfaces extending generally radially of its axis of rotation, abutment means providing opposed abutment surfaces on said second member and extending generally radially of its axis of rotation, said means including a semi-cylindrical bearing surface in engagement with a portion of said second member, the abutment surfaces on said second member being disposed between the abutment surfaces on said first member and being in slidable engagement therewith respectively, means for supporting said abutment means on said second member for rotation about an axis normal to the axis of rotation of said second member, said supporting means including rib members extending axially along said second member and radially into said grooves, each of said rib members having a spherically-curved outer radial surface in bearing engagement with an outer radial surface of said grooves and each of said rib members including semi-cylindrical recesses therein for receiving said semi-cylindrical bearing surface of said abutment means whereby said members may slide axially with respect to each other and rotate at uniform angular velocities in either direction of rotation.

3. In a universal joint, a first member adapted for rotation about a first axis, said first member having an interior cylindrical aperture coaxial with said first axis and opening into at least one end thereof and being provided with axially extending grooves of uniform width and depth the sides of which extend generally radially of said first axis and which grooves form oppositely facing planar abutment surfaces, a second member adapted for rotation about a second axis, said second member having a plurality of external ribs thereon provided with segmental-shaped apertures in the opposite general radial sides thereof and having portions of its exterior conforming to the surface of a sphere the center of which lies on said second axis, said second member fitting into said first member with said ribs located in said grooves and with at least some of said portions of said second member conforming to the surface of said sphere engaging the interior wall of said cylindrical aperture of said first member, segmental-shaped bearing members interposed between said radial sides of said grooves and said ribs with the planar sides thereof in engagement with the sides of said grooves and the curved sides thereof seated in said segmental apertures in said ribs.

References Cited

FOREIGN PATENTS

| | | |
|---|---|---|
| 961,268 | 11/1949 | France. |
| 1,341,628 | 9/1963 | France. |
| 514,488 | 11/1939 | Great Britain. |
| 731,081 | 6/1955 | Great Britain. |

HALL C. COE, *Primary Examiner.*